(12) United States Patent
Huang

(10) Patent No.: US 7,251,988 B2
(45) Date of Patent: Aug. 7, 2007

(54) TOPOGRAPHY ANALYZING SYSTEM

(75) Inventor: Chuan-De Huang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/336,241

(22) Filed: Jan. 20, 2006

(65) Prior Publication Data

US 2006/0174383 A1 Aug. 3, 2006

(30) Foreign Application Priority Data

Jan. 31, 2005 (CN) .................... 2005 1 0033141

(51) Int. Cl.
*G01B 5/28* (2006.01)
*H01J 3/14* (2006.01)
(52) U.S. Cl. .................. 73/105; 250/306; 250/307
(58) Field of Classification Search .......... 73/105; 250/306, 307
See application file for complete search history.

(56) References Cited

U.S. PATENT DOCUMENTS 5,473,157 A * 12/1995 Grober et al. ............. 250/234
5,627,365 A * 5/1997 Chiba et al. ............... 250/234
5,859,364 A * 1/1999 Toda et al. ................. 73/105
6,545,263 B2 * 4/2003 Lange et al. ............... 250/234
6,737,646 B2 * 5/2004 Schwartz ................... 250/306
2003/0005755 A1 * 1/2003 Schwartz ................... 73/105

* cited by examiner

*Primary Examiner*—Michael Cygan
(74) *Attorney, Agent, or Firm*—Jeffrey T. Knapp

(57) ABSTRACT

A topography analyzing system (10) for analyzing a topographic microstructure is provided. The topography analyzing system includes a three-dimensionally adjustable platform (12), a loading platform (13), a microscopic viewing device (14), a topography measuring device (11), and a mirror (15). The adjustable platform is adapted for adjusting the spatial positions of itself and what is loaded thereon. The loading platform is disposed on the adjustable platform and is adapted for having a workpiece (17) to be evaluated loaded thereon. The topography measuring device is aside/adjacent the adjustable platform. The topography measuring device includes a probe extending to and overhanging the workpiece for detecting topography of the workpiece. The mirror is secured at an adjustable angle relative to the three-dimensional adjustable platform and is adapted for forming a mirror image of the probe and a selected measuring area of the workpiece.

3 Claims, 2 Drawing Sheets

TOPOGRAPHY ANALYZING SYSTEM

BACKGROUND OF THE INVENTION

1. Field of the Invention

The present invention relates to a topography analyzing system and, particularly, to a topography analyzing system (i.e. profilometer) for analyzing topographical features of a workpiece.

2. Discussion of the Related Art

Topographical features can be key factors in evaluating surface quality of mechanical workpieces. Methods for analyzing topographical features include many types, most of which are associated with image processing technology A typical method for analyzing topographical features is an atomic force microscope (AFM) analyzing method. By this method, ideal analyzing data and images may be obtained. However, such equipment is too complicated and expensive to be used more widely.

Therefore, what is needed in the art is to provide a simple and relatively inexpensive system for analyzing topographical features of a workpiece.

SUMMARY

The present system for analyzing topographical features of a workpiece includes a three-dimensional adjustable platform, a loading platform, a microscopic viewing device, a topography measuring device, and a mirror. The three-dimensional adjustable platform is configured for adjusting the spatial (i.e., 3D) positions of itself and that which is loaded thereon. The loading platform is disposed on the three-dimensional adjustable platform and is adapted for receiving thereon the workpiece to be evaluated. The topography measuring device is set/positioned aside of the three-dimensional adjustable platform, and the topography measuring device includes a probe. The probe extends to and overhangs the workpiece. The probe is configured for detecting the topography of the workpiece. The mirror is secured with an angle of inclination relative to the three-dimensional adjustable platform, and such a mirror is adapted for forming a mirror image of the probe and a selected measuring area of the workpiece. Accordingly, the mirror allows the probe and the selected measuring area be observed from the microscopic viewing device.

An advantage of the present system for analyzing a given topographic microstructure is that it is simpler in structure and lower in cost than most of current systems for analyzing topographic microstructure.

Another advantage of the present system for analyzing topographic microstructure is that it is adapted for rapidly positioning zones to be analyzed, thus simplifiying operation and saving operating time.

A further advantage of the present system for analyzing topographic microstructure is that it is adapted for precision analysis of a three-dimensional topographic microstructure of a workpiece.

Other advantages and novel features will become more apparent from the following detailed description when taken in conjunction with the accompanying drawings.

BRIEF DESCRIPTION OF THE DRAWINGS

Many aspects of the present topography analyzing system can be better understood with reference to the following drawing. The components in the drawing are not necessarily to scale, the emphasis instead being placed upon clearly illustrating the principles of the present topography analyzing system.

The exemplifications set out herein illustrate at least one preferred embodiment of the present measuring system, in one form, and such exemplifications are not to be construed as limiting the scope of the system in any manner.

DETAILED DESCRIPTION OF THE PREFERRED EMBODIMENTS

Figure 1:
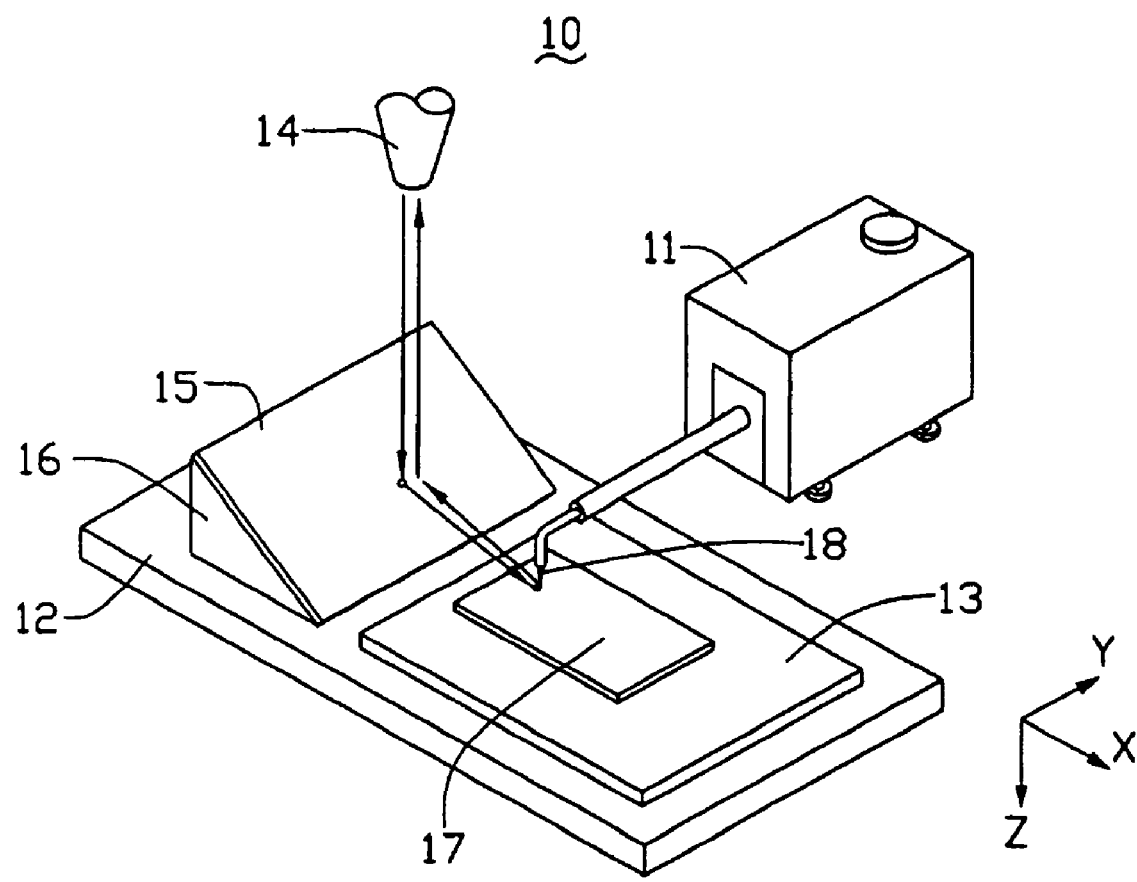
FIG. 1 is a schematic view of a system for analyzing topographic features of a workpiece, according to a preferred embodiment.

Referring to FIG. 1, it illustrates a system 10 for analyzing topographical microstructures of a workpiece 17. The system 10 includes a topography measuring device 11, a three-dimensional adjustable platform 12, a loading platform 13, a microscopic viewing device 14, and a mirror 15. The topography measuring device 11 further includes a probe 18 configured for detecting a given topography of the workpiece 17. The loading platform 13 is disposed on the three-dimensional adjustable platform 12 and is configured for carrying the workpiece 17 thereon. The three-dimensional adjustable platform 12 is capable of being adjusted so as to allow varied and different desired spatial (i.e., 3D) positions of the workpiece 17, which is loaded on the loading platform 13. The topography measuring device 11 is disposed adjacent and/or proximate the adjustable platform 12.

In discussing other system components, the probe 18 is configured for monitoring the X-Y (Cartesian position) thereof and, additionally, the depth or height (i.e., the Z component) thereat. The probe 18 of the topography measuring device 11 extends/protrudes from the topography measuring device 11 to a top surface of the workpiece 17. Any suitably precise x-y-z (e.g., accurate to micron-scale, especially in z-direction) probe may be used for the probe 18. The mirror 15 is secured on the adjustable platform 12 with an angle of inclination thereof relative to the adjustable platform 12. According to an aspect of the system 10, an adjustable mirror supporter 16 is positioned upon the adjustable platform 12 and is employed for supporting/carrying the mirror 15 and for permitting an adjustment of the height and/or angle of inclination of the mirror 15 relative to the adjustable platform 12. The adjustable supporter 16 is distinct from the mirror 15, the mirror 15 being mounted thereon (as shown in FIG. 1). The microscopic viewing device 14 is disposed over the mirror 15 and is adapted for facilitating a selection of zones of the surface of the workpiece 17 to be analyzed. The microscopic viewing device 14 can be an optical microscope or a more complex electron microscope, such as a scanning electron microscope (SEM), depending on the precision required to adequately evaluate the surface topography.

It is to be noted that the reflective mirror 15, as disposed on the adjustable platform 12, is exemplified for illustration purposes only. The exemplary position of the reflective mirror 15 should not be construed as a limitation to the present topography analyzing system 10. In other exemplary embodiments, the reflective mirror 15 can also be configured as being set/disposed on the loading platform 13 or spaced apart from the adjustable platform 12. The adjustable mirror supporter 16 can be employed for adjusting the angle of inclination and/or position of the reflective mirror 15 relative to the adjustable platform.

Figure 2:
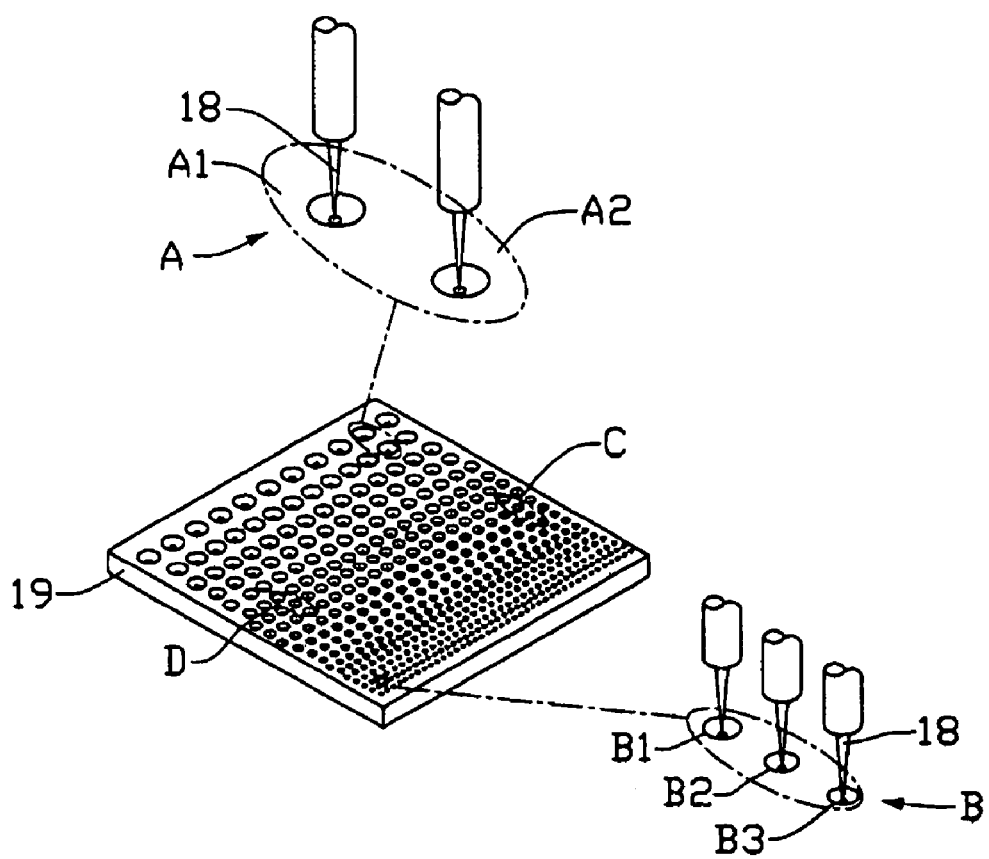
FIG. 2 shows an operation process for analyzing topographical features of net dots of a light guide plate using the system of FIG. 1.

Referring to FIG. 2, by way of example, an operation process for analyzing a topographic microstructure of a light guide plate having a plurality of net dots thereon, using the system 10, is described as follows. A light guide plate 19 for a backlight module of a flat panel display usually has a plurality of dots (e.g., convex and/or concave relative to the plate surface) distributed on a surface thereof, arranged in an array. The dots are continuously changed in sizes and depths/heights from one side of the surface to another side. The light guide plate 19 is set on the loading platform 12 or the three-dimensional adjustable platform 13, with a surface having the dots distributed thereon facing upward. The surface of the light guide plate 19 includes a maximum dot zone, a minimum dot zone and two medium dot zones, such zones indicating the relative size and/or distribution of dots in that zone.

First, a maximum dot zone A is tracked and located by adjusting the adjustable platform 13, with the light guide plate 19 positioned thereon. Mirror images of the zones to be detected are formed via the mirror 15. The mirror images of the dot zones can be viewed using the microscopic viewing device 14. The operator may, according to the images viewed via the microscopic device 14, adjust the three-dimensional adjustable platform such that the maximum dot zone A is located/locked. As shown in the enlarged part for illustrating dot zone A of FIG. 2, the probe 18 detects and measures the depth of the dot A1. The value of the depth of the dot A1 can be obtained according to the coordinate data of the probe 18 along the Z direction. The probe 18 is then moved along the X direction to the next dot A2. The depth of the dot A2 is obtained in a similar manner. Similarly, a minimum dot zone B and two medium dot zones C and D are also measured. According to the exemplary embodiment, the minimum dot zone B includes three dots to be measured. The medium net zone C includes four dots to be measured. The medium dot zone D includes three dots to be measured. The obtained data of depths respectively of the dot zones A, B, C and D are listed in Table 1.

TABLE 1

| Net zone | Corresponding | Dot 1 (μm) | Dot 2 (μm) | Dot 3 (μm) | Dot 4 (μm) | Average (μm) |
|---|---|---|---|---|---|---|
| A | Maximum | 31.51 | 32.01 | — | — | 31.76 |
| B | Minimum | 29.44 | 29.07 | 29.06 | — | 29.17 |
| C | Medium | 31.97 | 31.29 | 32.20 | 32.76 | 32.06 |
| D | Medium | 30.01 | 30.91 | 30.40 | — | 30.44 |

It can be known from Table 1, the present topography analyzing system 10 can achieve data on a micrometer scale, which is sufficient for evaluating topography of the light guide plate 19 and analyzing the dot distribution and defects of the light guide plate 19.

Figure 3:
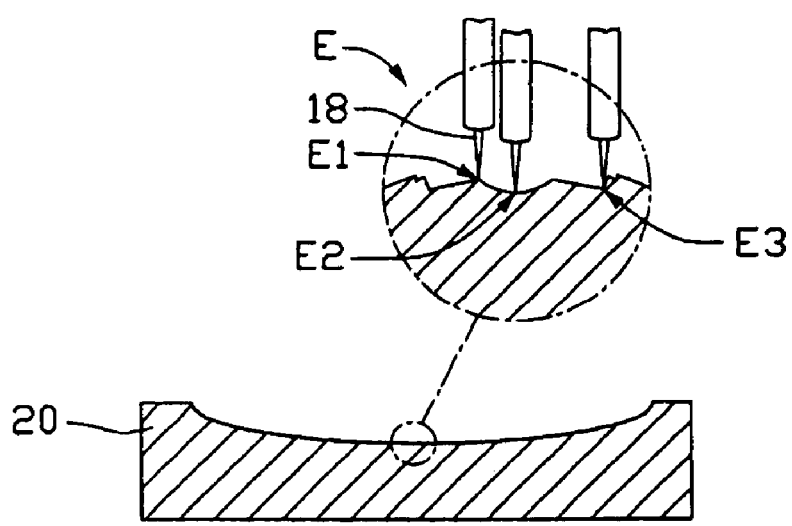
FIG. 3 shows an operation process for analyzing topographical features of a lens mold insert using the system of FIG. 1.

Referring to FIGS. 1 and 3, an operation process for analyzing topographic microstructure of a lens mold insert 20, using the system 10, is illustrated. The lens mold insert 20 is first secured on the loading platform 13. The lens mold insert 20 has a mirror image relative to the mirror 15. The operator can view the image through the microscopic viewing device 14. According to the image viewed from the microscopic viewing device 14, the operator selects a desired zone, as shown in the enlarged portion E of the lens mold insert 20 of FIG. 3. Three exemplary points E1, E2 and E3 are then selected. The probe 18 is then controlled to measure the depths of the points E1, E2 and E3, respectively. The depths of the points E1, E2 and E3 are obtained and listed in Table 2 as below.

TABLE 2

| coordinates at X direction and Z direction of points E1, E2 and E3 | | |
|---|---|---|
| Point | X direction coordinate (mm) | Z direction coordinate (μm) |
| E1 | 1.29 | 8.0 |
| E2 | 0.65 | 132.6 |
| E3 | 0.39 | 12.6 |

Although more data might be further demanded for a more thorough and/or precise evaluation, the data listed in Table 2 are sufficient, in this example, for evaluating the surface quality of the lens mold insert 20.

It is to be further understood that the above-described embodiments illustrate the scope of the invention but do not restrict the scope of the invention. Variations may be made to the embodiments without departing from the spirit or scope of the invention as claimed herein.

What is claimed is:

1. A topography analyzing system comprising:
an adjustable platform selectably movable in three-dimensional space;
a loading platform disposed on the adjustable platform, the loading platform being configured for carrying a workpiece thereon;
a topography measuring device disposed adjacent the adjustable platform, the topography measuring device comprising a probe configured for detecting a topography of the workpiece;
a mirror disposed with an angle of inclination thereof relative to the adjustable platform, the mirror being configured for forming a mirror image for the probe and a selected measuring area of the workpiece;
a microscopic viewing device configured for observing the probe and the selected measuring area by way of viewing the mirror image of the probe and the selected measuring area in the mirror; and
an adjustable supporter positioned upon the adjustable platform, the adjustable supporter being configured for supporting the mirror and for adjusting at least one of a height and the angle of inclination of the mirror.

2. The topography analyzing system as described in claim 1, wherein the mirror is disposed on the adjustable platform.

3. The topography analyzing system as described in claim 1, wherein the mirror is spaced apart from the loading platform.

* * * * *